May 16, 1950
T. GAVAGNIN
2,507,897
AIR AND GAS CLEANER
Filed Sept. 27, 1946
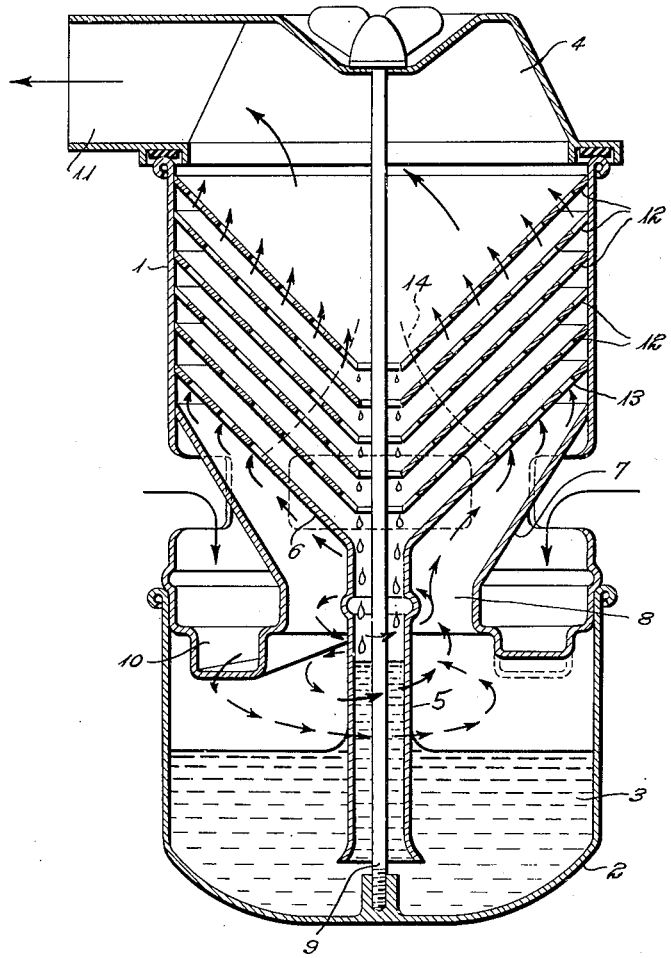
INVENTOR
*Tullio Gavagnin*
BY *Stevens, Davis and Miller*
ATTORNEYS

UNITED STATES PATENT OFFICE 2,507,897

AIR AND GAS CLEANER

Tullio Gavagnin, Genoa, Italy

Application September 27, 1946, Serial No. 699,660
In Italy October 2, 1945

2 Claims. (Cl. 183—15)

This invention relates to air and gas cleaners especially adapted for use as air cleaners for combustion engines, of the class of cleaners employing a fixing liquid, generally oil, for fixing road grit or other solid matters contained in the combustion air.

In this connection, it is to be mentioned that, in the following specification and claims the term "air" shall include any gaseous substance, including the air proper, the term "grit" shall include any pulverulent or solid matter suspended in the "air" and the term "oil" shall include any substantially non volatile liquid adapted to act as fixing means for the "grit."

Now, in the known cleaners of the above mentioned class, a number of drawbacks are experienced, among which the following ones may be mentioned:

1st. As the air is caused to come into intimate contact with the fixing oil, it drags along minute particles of oil contaminated with absorbed grit. Thus the air must be again cleaned both in order to avoid that a part of the grit equally comes into the carbureter and that the oil of the cleaner be gradually absorbed by the combustion air. As however this second filtration is generally effected by causing the air to traverse a chamber filled with filtering bodies, it happens that after a certain time these bodies become covered with a thick sludge of oil and grit that is not easily washed out by the incoming oil and promotes a substantial obstruction of the filter entailing heavy load losses.

2nd. As the air passes through the filter wetted with oil, it tends to drag along a part of the oil from the upper part of the filter and to leave the oil cleaner dry after a short working time.

According to this invention the drawbacks of the known cleaners are overcome by substituting to the known static air filters (constituted of a large number of Raschig rings or of metallic chips) a filter constituted of a number of spaced diaphragms, preferably of the perforated or strainer type, holding back the oil without permitting of its accumulation, so as to avoid that the air passages be gradually obstructed by a mixture of oil and grit.

This end is better attained by providing an oil sump and a restricted oil-collecting area, as well as air baffles providing for a zone of quiet and of depression through which the oil, carried along with the air and intercepted by the spaced diaphragms, is allowed to flow back into the oil sump.

Other objects and advantages will be apparent from the following specification, reference being had to the attached drawing showing a vertical section of a preferred embodiment of air cleaner.

The air cleaner comprises a substantially cylindrical body 1 closed at its bottom part by a cup-shaped bottom 2, which constitutes the sump for the fixing oil 3, and at its top by an air-tight cover 4.

The cylindrical body 1 contains the device for separating the oil particles carried along by the air and causing same to flow back into the sump 3. This device will be particularly described hereinafter. Below this separator an oil-return duct 5 is fitted, connected at its upper end to a collecting funnel 6. A solid conical diaphragm 7 provided with a restricted aperture 8 separates the lower air cleaner part form the upper one.

The whole cleaner is assembled by a threaded tie rod 9 passed through the cylindrical body 1, screwed by its threaded lower end into a tapped socket of the lower cup-shaped part 2 constituting the oil sump 3 and holding the cover 4 tightened against the top rim of the cylindrical body 1 by means of a wing nut.

The intake of the air to be cleaned is effected in the lower cleaner chamber, i. e. in the part of the cleaner under diaphragm 7, and takes place preferably through tangential intakes 10, while the outlet of the cleaned air is effected through upper duct 11.

The separator, which substitutes the usual air filters, comprises a number of superposed suitably spaced conical strainers 12, preferably made of perforated sheet metal.

The first of said strainers is inserted in the central part of the collecting funnel 6, which thus occludes the perforations around the central area of said strainer. As will be seen hereinafter, this arrangement is essential for the working of the device.

The working of the device is as follows:

The air penetrates into the cylindrical body 1 through tangential intakes 10 and assumes a whirling motion, whereby the heaviest grit particles are removed by centrifugal action and fall into the oil 3 within the sump.

Successively the air, by following the path indicated by arrows, passes through the restricted aperture of funnel-shaped diaphragm 8 and draws up, by the action of the vacuum generated in correspondence of the central part, an upward flow of liquid which is projected for the most part against the outer surface of funnel 6 and then tangentially against the lower conical diaphragm or strainer 13. The air passing through the perforations of this first strainer, which carries in suspension a mist of oil, is projected against the subsequent conical strainers the surfaces of which being wetted by the oil dragged along with the air absorb the lighter grit particles. Said conical strainers are fitted in such a number, as to ensure of the last strainer intercepting substantially dry and thoroughly grit-free air.

As the conical strainers slope towards the centre, the oil intercepted by the strainers is compelled to flow towards the centre portion thereof until it comes into the vacuum zone (shown by dotted lines and indicated by 14) promoted by funnel 6 and drips into this latter and through return duct 5 flows back into sump 2.

It is thus apparent that the conical strainers 12 are constantly wetted by the oil carried along with the air and thus fix the residual grit contained in the air passing therethrough. Besides fixing the grit particles, this oil on the strainer acts so as to continuously wash away the intercepted grit particles and carries same down into the sump, where they deposit as a sludge.

From the foregoing the advantages of the improved air cleaner are apparent, as it is apparent that the improved device may be embodied in a number of different ways, all without departing from the spirit of the invention or the scope of the appended claims.

Having thus described my invention, I claim:

1. An air cleaner comprising a vertically arranged hollow cylinder body, a cover at the top of said body defining an air exhaust passageway for connection to a source of suction, a sump cup closing the lower end of said body, a plurality of air intake ports in the side of said body near said cup, means within the body to impart swirling motion to air introduced through said ports and to project said air against the oil in said cup, a plurality of coaxially arranged conical members arranged in spaced relation in said body above said ports and with their apices toward said sump, said members together defining a tortuous air passageway from said sump to said cover, and means defining a passageway from the apex end of the lowermost member to a point below the normal oil level in said cup.

2. An air cleaner comprising a vertically arranged hollow cylinder body, a cover at the top of said body defining an air exhaust passageway for connection to a source of suction, a sump cup closing the lower end of said body, a plurality of air intake ports in the side of said body near said cup, means within the body to impart swirling motion to air introduced through said ports and to project said air against the oil in said cup, a plurality of coaxially arranged conical perforate strainers arranged in spaced relation in said body above said ports and with their apices toward said sump, and means defining a passageway from the apex end of the lowermost strainer to a point below the normal oil level in said cup.

TULLIO GAVAGNIN.

REFERENCES CITED

The following references are of record in the file of this patent:

UNITED STATES PATENTS

| Number | Name | Date |
|---|---|---|
| 1,413,160 | Dickey | Apr. 18, 1922 |
| 1,751,915 | Hall et al. | Mar. 25, 1930 |
| 1,876,465 | Misner | Sept. 6, 1932 |
| 2,230,453 | Fitch | Feb. 4, 1941 |

FOREIGN PATENTS

| Number | Country | Date |
|---|---|---|
| 102,754 | Sweden | Oct. 14, 1941 |